(No Model.)

R. H. CANFIELD.
BACK PEDALING BRAKE.

No. 602,974. Patented Apr. 26, 1898.

WITNESSES:
Arthur Ashley
P. L. Mosher

INVENTOR
R. H. Canfield
BY
P. T. Dodge
ATTORNEY.

THE NORRIS PETERS CO., PHOTO-LITHO., WASHINGTON, D. C.

UNITED STATES PATENT OFFICE.

ROBERT H. CANFIELD, OF CORNING, NEW YORK.

BACK-PEDALING BRAKE.

SPECIFICATION forming part of Letters Patent No. 602,974, dated April 26, 1898.

Application filed May 19, 1896. Serial No. 592,185. (No model.)

*To all whom it may concern:*

Be it known that I, ROBERT H. CANFIELD, of Corning, county of Steuben, and State of New York, have invented a new and useful Improvement in Velocipede-Brakes, of which the following is a specification.

My invention relates to that class of brakes in which the brake is thrown into action by the operation of "back-pedaling."

The object of the invention is to provide a simple, efficient, and inexpensive brake of the class referred to.

The invention consists in the construction and combinations hereinafter described, and pointed out in the claims.

Figure 1:
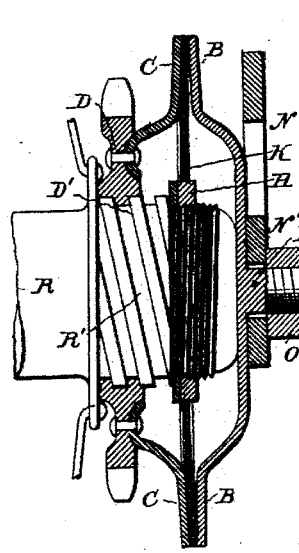
Figure 2:
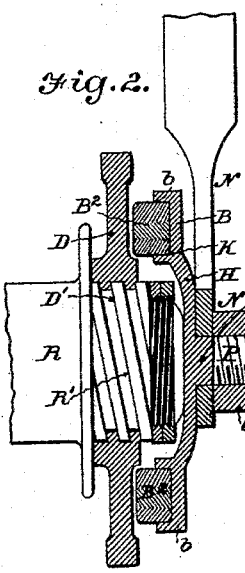
Figure 3:
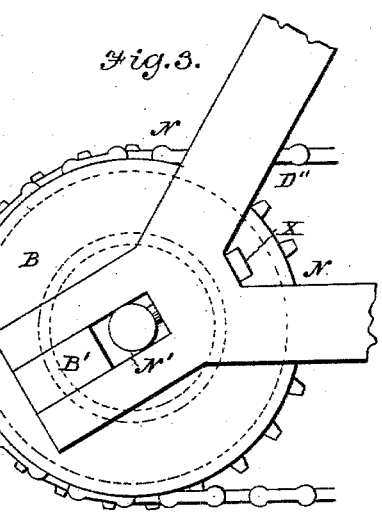
Figure 4:
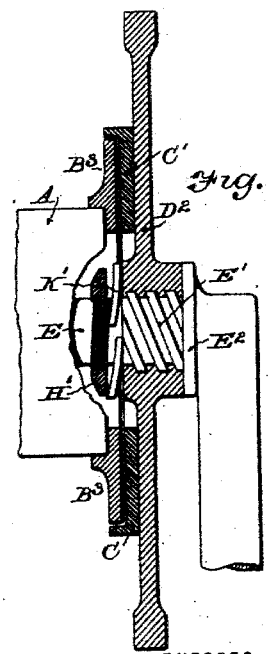
Figure 5:
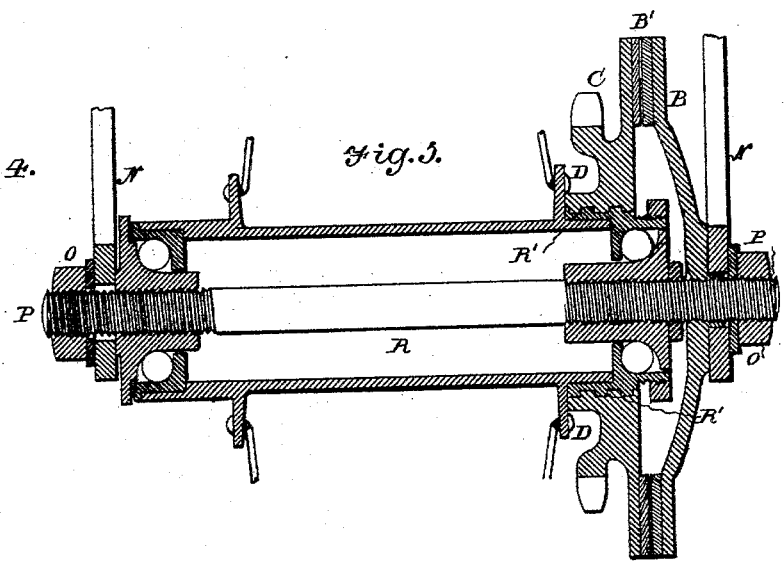

Referring to the drawings, Figure 1 is a sectional view showing a portion of the rear bicycle-wheel, its sprocket, and axle with my improved brake mechanism applied. Fig. 2 is a similar view slightly modified. Fig. 3 is a side elevation thereof. Fig. 4 is a sectional view of a further modification, in which the brake mechanism is applied to the pedal-shaft, its sprocket, and the box or bearing;
and Fig. 5 is a longitudinal section through the rear bearing of a bicycle, showing the brake-surface integral with the sprocket-wheel and the faces of the brake-surfaces furnished with leather.

In Figs. 1, 2, and 3, N represents the rear end portion of a bicycle-frame provided with the usual fork or slot N', in which is mounted the rear axle P, on which rotates the hub R of the rear wheel. The hub R is provided at one end, adjacent to its spoke-flange, with a coarse screw-thread R', and the sprocket-wheel D has its bore threaded, as at D', to correspond therewith and is loose on this threaded portion R', so that when the sprocket-chain D'' applies power to the sprocket in a direction to drive it forwardly the sprocket will bind against the spoke flange or end of the hub and thereby cause the rear wheel to rotate with the sprocket; but when the rider resorts to back-pedaling the chain will reverse its strain on the sprocket-wheel and cause it to rotate backwardly on the hub, and consequently move longitudinally along said hub toward the outer end thereof, owing to the coarse screw-threaded connection therewith. The outward movement of the sprocket D along its hub is limited by the nut H and washer K.

C is a brake-disk fixed to the outer face of the sprocket D to contact with a stationary brake-disk B when the sprocket is forced outwardly by back-pedaling. This stationary brake-disk is provided with a central aperture for the free passage of axle P and with a lug B', which enters the slot or fork N' and holds the disk B from rotation.

Owing to the pitch of the threads R' D' the brake will be quickly applied and released, and the operator's sense of feeling will soon enable him to regulate the application of the brake with nicety.

The adjacent faces of the brake-disks C B may either or both be provided with leather or other suitable material, if desired, as shown in Fig. 5.

In the above construction the disk C may be secured to or formed integral with the sprocket-wheel, as shown in Fig. 5; but, if desired, the disk C may be omitted and the face of the sprocket contact with the stationary braking-surface B, as shown in Fig. 2. In this construction the inner face of the stationary braking surface or disk B is provided with an annular channel $b$, in which is fitted a ring $B^2$, of leather or other suitable material, to contact with the friction-face of the sprocket-wheel. This friction face or surface of the sprocket D may be formed in any desired manner, just so long as the principle is preserved of having the sprocket act as a brake during back-pedaling by moving laterally along the hub into engagement with a fixed or stationary friction-surface, whether the same be applied to or formed as an integral part of the frame.

O is the usual nut on the outer end of the axle, and X is the usual screw for adjusting the axle.

Referring now to Fig. 4, it will be seen that the principle involved may be readily applied to the pedal-sprocket and adjacent parts. In this figure A represents the stationary box or bearing for the pedal-shaft E, and $B^3$ is the stationary friction-surface, consisting of a ring or flange secured to or formed on the end of the box or bearing. The pedal-shaft is provided with the coarse screw-threads E', on which the driving-sprocket D² turns and slides after the manner of the rear sprocket D on its hub, as when the pedaling is forward the sprocket-wheel will move outward, bind on the shoulder E², and turn with shaft E; but when back-pedaling is resorted to the sprocket-wheel D² will move inwardly along its shaft into engagement with the stationary friction-surface B³. The sprocket D² may contact directly with surface B³ or indirectly through the medium of a ring C' of any suitable material. H' is the stop nut or ring on the axle E to limit the movement of the sprocket-wheel D² toward the stationary surface B³, and K' is a washer in the form of a cushioning-spring and interposed between the nut H' and the sprocket-wheel to cushion the movement of the sprocket toward said stationary surface. F is one of the crank-arms of the pedal-shaft.

In Fig. 5 I have shown a longitudinal section through the rear sprocket-wheel and its bearing, in which it will be seen that the sprocket-wheel has the bearing-disk C formed integral therewith and in which it will be further seen that the faces of the two braking-surfaces—that carried by the sprocket-wheel and the fixed surface B—are provided with a facing of leather or other suitable material B'.

I do not claim herein the combination, broadly, of a rotatable shaft having a screw-threaded portion, a non-rotatable brake-surface adjacent thereto, and a screw-threaded driving-wheel mounted upon the threaded portion of the shaft, having a limited rotation thereon and provided with a friction-surface for engaging with the non-rotatable surface when the driving-wheel is rotated relatively with the shaft; but What I do claim, and desire to secure by Letters Patent, is as follows:

1. In a bicycle or analogous machine, the combination with the frame, of a rotary driving member mounted therein, a fixed brake-surface mounted on the axis thereof, a laterally-acting brake-wheel movable along the axis of said member and adapted to coact with the fixed brake-surface, and an adjustable device situated between the fixed brake-surface and the movable brake-wheel, and serving to limit the lateral movement of the latter.

2. In a bicycle or analogous machine, the combination with the driving-wheel and driving means, of a fixed brake-disk mounted on the axis of said wheel, a laterally-moving brake-wheel mounted on the hub of the drive-wheel, and adapted to coact with the fixed disk, and an adjustable nut screwed on the end of the hub between the fixed brake-disk and the movable brake-wheel and serving to limit the lateral movement of the latter.

3. In a bicycle or analogous machine the combination with a rotary driving member, of a fixed brake-surface, a laterally-acting brake-wheel movable along the axis of the rotary member, an adjustable stop-nut situated between the fixed brake-surface and the movable brake-wheel, and a cushioning device independent of said brake device and situated between the stop-nut and the movable brake-wheel.

In testimony whereof I hereunto set my hand, this 6th day of May, 1896, in the presence of two attesting witnesses.

ROBERT H. CANFIELD.

Witnesses:
J. T. KERST,
E. A. AVERETT.